July 23, 1935.   D. K. WARNER   2,009,284

FLOAT CONTROL REGULATING VALVE

Filed June 23, 1930

INVENTOR.
Douglas K. Warner

Patented July 23, 1935

2,009,284

UNITED STATES PATENT OFFICE 2,009,284

FLOAT CONTROL REGULATING VALVE

Douglas K. Warner, Bristol, Conn.

Application June 23, 1930, Serial No. 463,051

1 Claim. (Cl. 137—101)

My invention relates to the maintaining of desired liquid levels in evaporating boilers and more particularly to the type used in refrigeration where all the interior of a drum is filled with tubes and it is desirable that all tubes be wet with refrigerant all the time without any liquid leaving the boiler with the vapor.

To accomplish this, it is not only necessary to have a float control which will operate with a minimum variation in level but it is also necessary to automatically lower that level when the load on the boiler increases, because at higher evaporating rates, there is more violent boiling and surging, and liquid will flash up to a higher point above its surface. Long service without cleaning, will also sometimes permit foreign substances to get into the evaporating liquid and cause it to boil and foam more violently so that there should be a manual control as well to lower the liquid level still further in a dirty evaporator. An ammonia float-control is far more difficult to design than one for any other liquid, first because of the varying and very high pressures it must operate against, and second because the fluid is very light and has, therefore, little lifting power. In fact a steel ball strong enough to stand any possible pressure to which it might be subjected is too heavy to even float its own weight. Where safety factors are sacrificed on the hope that the high pressures may not occur, the weight of the ball is still such that it is more than half submerged before it takes any load of opening the valve, and by the time it gets the valve open it is almost completely submerged, so that variations in liquid level act only on a very small diameter at the top of the ball, consequently having a minimum effect. The result is that the valve body must be extremely large for a tiny orifice opening, but even so it will have no safety factor nor ability to operate at extreme pressures.

Figure 1:
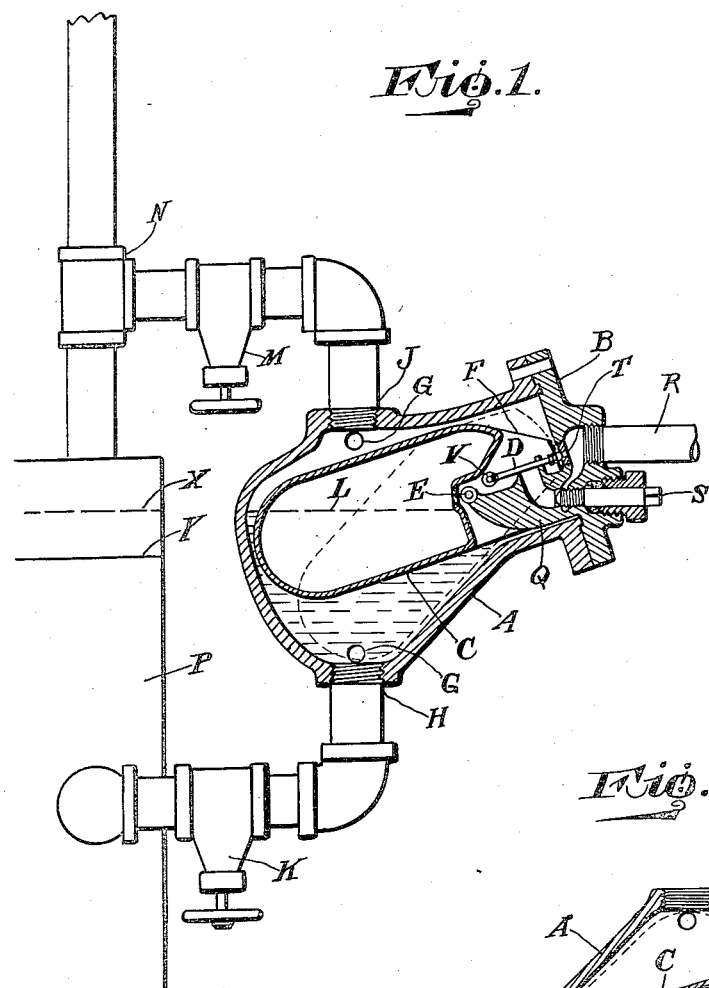
Figure 1 is a sectional elevation showing a float control regulating valve in accordance with this invention in association with an evaporator.

In Fig. 1 is shown a valve with its float compactly counter-balanced in its own body, the fulcrum E being placed within the hollow part of the float and a heavy counter-weight swung out from it on either side of its supporting member and the valve stem. In this Fig. 1 position, an increase in liquid level L, raises float C around its fulcrum E. In so doing, pin V which is fastened in the counter-weights F is swung to the right in an arc about E. Valve stem D and ball T are accordingly moved to the right until ball T closes on its seat. This occurs shortly before V has approached a straight line between E and T where the leverage to close the valve would become infinite providing there were no elasticity or wear in the materials. Since high resistance to opening and closing the valve is present only when the valve is close to, or on the seat, the great increase in leverage afforded by this simple toggle-joint permits a wide opening of the valve to pass dirt and still the ability to close against high pressures with a minimum lift from the ammonia. Since the float C utilizes all the space within the float chamber A, a minimum size float-chamber and a minimum volume of liquid is required.

Figure 2:
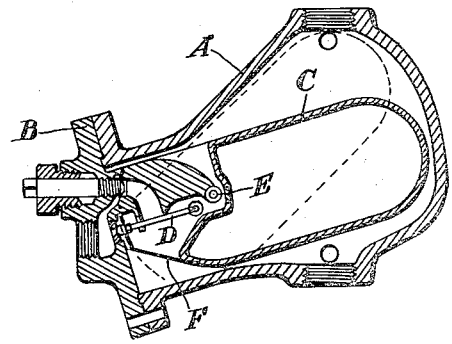
Figure 2 is a section through the valve showing the same inverted.

Fig. 2 shows the same float valve in a reverse position. Used in this manner, as fast as liquid falls in, from the condenser, thru the pipe hole at the top, and lifting the float C, it is drained away at T. In this case, the pressure tends to hold the valve against the seat. The valve is tilted in such a way that when the liquid level gets as low as the orifice, there will be as much liquid lift on the heavy end of the float as on the light end. The float end slightly overbalances the heavy end so that even in case there were little or no pressure difference across the orifice the valve would close before the level got low enough to allow vapor to pass out the orifice. In Fig. 1 or in what will be called the low pressure valve, this same tilt reversed permits the liquid to enter well above the surface of liquid operating the float.

Figure 3:
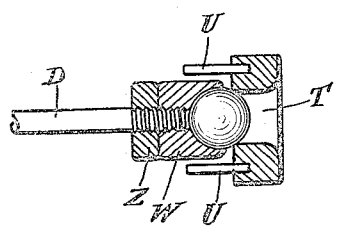
Figure 3 is a fragmentary sectional plan showing the valve stem and seat therefor.

In squirting thru the orifice, the pressure on the liquid drops and part of it turns into vapor. By releasing it above the control surface, instead of below it, violent agitation of the liquid operating the float is prevented. However, there would still be violent agitation if any of the liquid squirting out of the orifice were permitted to impinge on the surface of the liquid in the float chamber, for its high velocity would at once carry it clear to the bottom and the liquid would be as much disturbed as if the fresh liquid had entered below its surface. The float support-arm Q and the counterweight walls F prevent this by deflecting the rush of incoming liquid, and before the liquid has had a chance to get over into the main body of the valve the gas has entirely separated out and the gas passes out opening J in a dry state while the liquid flows over the surface of the float and down to the liquid level. It is thus possible to introduce the liquid directly to the float chamber which is a very desirable asset for it is then possible to automatically regulate the depth of liquid in the evaporator according to the capacity at which it is being operated. The liquid valve K may be partially closed to restrict the flow from the valve body, and under these conditions the greater the quantity of liquid flowing, the greater will the pressure head have to be to make it flow. L represents the normal liquid level in the valve and X the liquid level in the evaporator at no load, or the same level as that in the float chamber. In order to have a certain quantity of liquid flow past the obstructing valve K, the liquid level in evaporator P will have to fall to level Y. The T N on the suction gas line is then so placed that the gas resistance or pressure drop from the evaporator P to the connection N is equal to the pressure drop of the flash gas from the valve chamber to N. The same effect may of course be obtained by restricting the suction gas line between P and N and leaving K open, as this would decrease the pressure above the liquid in the valve and accordingly require a lower level in P before the liquid could run out to it from the valve. By connecting the top of the valve J directly with the top of the evaporator an opposite effect will be produced, namely to increase the level in the evaporator with increasing loads; but if the resistance of the top connection be made very small, and the bottom connection resistance high, the correct variations may be again obtained. For the passage of a maximum amount of liquid thru an orifice, the opening of the orifice should be rounded off, and the valve should move ½ its diameter entirely away from the seat. A rounded ball-point valve will effect the least resistance. Also a ball-point valve is sure to make a tight seat no matter at what angle the stem may be when the valve approaches the seat. In this case a hardened and accurately ground ball-bearing ball is fitted into an adapter shown in Fig. 3, letter W, and the length of the stem adjusted (by locknut Z and thread in adapater W) so that the valve will be closed with sufficient clearance to allow for wear. The adapter is peened over to hold ball. Pins U guide the ball to its seat. The valve stem D slidably extends through a guide element located inwardly of the orifice T. Gage glass connections G are provided on body.

The valves are provided with hand-controlled by-pass valves so as to save time in filling up an empty cooler, to use in emergency, or to increase the capacity of the valve as much as 4-fold. With a constant level or low pressure valve, it is of course as undesirable to use the by-pass for operating as it is to use a rotary or piston-type valve, because it makes it necessary for a man to close a valve when operation ceases in order to prevent the cooler flooding over. However if a man is willing to do this he may use a much cheaper tight seat valve than the leaky seat type would cost, and he will not have to figure on replacing the seats and pistons every year or two. Where a high pressure type valve leads from a condenser to an intermediate pressure receiver, it is perfectly safe to use the by-pass valve for up to three quarters of the total flow. If the machine stops with the by-pass open, merely the small amount of gas in the condenser will pass to and equalize with the gas pressure in the receiver and no harm will have been done. However, flooding a cooler is a decidedly dangerous proposition, and a by-pass or a type of valve which must inherently leak or soon wear leaky, should never be used on a cooler or accumulator unless the operator is fully aware of the dangers involved, and has the time and energy to act promptly at critical times. A by-pass is always convenient to use in case something happened to the float valve and permits using the apparatus while waiting for the repair man to come. It also assures ability to pump out all the gas from both sides of the float valve with one pump-out connection, so saving a lot of time in taking the valve down. Located on the valve, it saves time and much erecting cost. To take valve apart, it is only necessary to disconnect pipe R and remove the valve head which is light and carries all the working parts. The valve seat may be easily replaced or a new ball tapped into the adapter on the valve stem. There are no other parts.

For good efficiency, it is essential that all evaporating surface be wet, and also that only dry saturated gas go back to the compressor. This condition can only be attained with hand operation if an operator sits at each expansion valve 24 hours a day continually adjusting the valve. Old pipe coils can be made more efficient by connecting both ends with a trap and float valve placed a short distance above them or by connecting with a flooded accumulator.

Having now described and explained my invention, what I claim as new, and on which I desire Letters Patent, is—

A float control structure for heat transfer systems comprising a hollow body forming a float chamber, said body having its intermediate portion of greater diameter than its end portions and being formed with a pair of diametrically opposed openings adapted to receive oppositely disposed tubular conducting means, said body having one of its end portions closed and its other end portion open, said open end portion being of smaller diameter than the closed end portion, a closure for the said open end portion having an opening forming an inlet for said chamber, the inner end of the wall of said inlet providing a valve seat, a float actuated valve coacting with said seat for controlling the admission of liquid to said chamber, a float within said chamber having a weighting means arranged within said end portion of smallest diameter, a slidable actuating means for said valve pivotally connected at one end to said weighting means adjacent one end of the latter, a support within said end portion of smallest diameter, means for pivotally connecting said weighting means to said support adjacent to the pivot for said actuating means, a depending guide carried by said closure for said actuating means, said guide being spaced from the inner end of the inlet, and said float extending from one of said end portions to the other.

DOUGLAS K. WARNER.